United States Patent
Lovis et al.

(10) Patent No.: US 11,535,022 B2
(45) Date of Patent: Dec. 27, 2022

(54) METHOD AND APPARATUS FOR RECYCLING PACKAGING MATERIAL

(71) Applicant: saperatec GmbH, Bielefeld (DE)

(72) Inventors: Florian Lovis, Bielefeld (DE); Marcus Schulze, Bielefeld (DE)

(73) Assignee: SAPERATEC GMBH, Bielefeld (DE)

( * ) Notice: Subject to any disclaimer, the term of this patent is extended or adjusted under 35 U.S.C. 154(b) by 0 days.

(21) Appl. No.: 16/468,406

(22) PCT Filed: Dec. 15, 2017

(86) PCT No.: PCT/EP2017/082971
§ 371 (c)(1),
(2) Date: Jun. 11, 2019

(87) PCT Pub. No.: WO2018/109147
PCT Pub. Date: Jun. 21, 2018

(65) Prior Publication Data
US 2019/0351663 A1    Nov. 21, 2019

(30) Foreign Application Priority Data

Dec. 15, 2016 (GB) .................................. 1621371

(51) Int. Cl.
*B32B 43/00* (2006.01)
*B32B 38/10* (2006.01)

(52) U.S. Cl.
CPC ............ *B32B 38/10* (2013.01); *B32B 43/006* (2013.01); *Y10T 156/1111* (2015.01); *Y10T 156/1116* (2015.01)

(58) Field of Classification Search
CPC .. B32B 38/10; B32B 43/006; Y10T 156/1111; Y10T 156/1116
See application file for complete search history.

(56) References Cited

U.S. PATENT DOCUMENTS

| 5,127,958 A | 7/1992 | Personette |
| 5,421,526 A | 6/1995 | Johansson |

(Continued)

FOREIGN PATENT DOCUMENTS

| CN | 101054446 A | 10/2007 |
| CN | 101054779 A | 10/2007 |

(Continued)

OTHER PUBLICATIONS

Dahai Yan et al., Optimizing and developing a continuous separation system for the wet process separation of aluminum and polyethylene in aseptic composite packaging waste, Waste Management 35 (2015) 21-28.

(Continued)

*Primary Examiner* — Philip C Tucker
*Assistant Examiner* — Nickolas R Harm
(74) *Attorney, Agent, or Firm* — 24IP Law Group USA, PLLC; Timothy Dewitt

(57) ABSTRACT

A method for recycling of packaging material is disclosed. The packaging material comprises a multilayer material (10) comprising a metal layer (30) and at least one polymer layer (20, 40). The method comprises placing the packaging material in a vat (310) comprising a separation fluid (330) to produce a mixture of metal shreds from the metal layer (30), plastic shreds from the polymer layer (20, 40) and residual components. The separation fluid comprises a mixture comprising a mixture of water, a short-chained carboxylic acid, phosphoric acid and an alkali metal hydroxide solution.

7 Claims, 3 Drawing Sheets

(56) References Cited

U.S. PATENT DOCUMENTS

| | | |
|---|---|---|
| 2002/0019449 A1 | 2/2002 | Lee et al. |
| 2002/0033475 A1 | 3/2002 | Bejarano et al. |

FOREIGN PATENT DOCUMENTS

| | | | |
|---|---|---|---|
| CN | 101891903 | A | 11/2010 |
| CN | 102206359 | A | 10/2011 |
| CN | 102744246 | A | 10/2012 |
| CN | 102773242 | A | 11/2012 |
| CN | 103030126 | A | 4/2013 |
| CN | 103131042 | A | 6/2013 |
| CN | 104592546 | A | 5/2015 |
| CN | 104744724 | A | 7/2015 |
| CN | 106393479 | A | 2/2017 |
| DE | 4137895 | C1 | 3/1993 |
| EP | 0543302 | A1 | 5/1993 |
| EP | 1975987 | A2 | 10/2008 |
| JP | 2000-34362 | A | 2/2000 |
| JP | 2008-7630 | A | 1/2008 |
| JP | 2014-507529 | A | 3/2014 |
| WO | 0146305 | A2 | 6/2001 |
| WO | 03104315 | A1 | 12/2003 |
| WO | 2012101189 | A1 | 8/2012 |
| WO | 2015169801 | A1 | 11/2015 |
| WO | 2017108014 | A1 | 6/2017 |

OTHER PUBLICATIONS

Minghui Xie et al., Life cycle assessment of composite packaging waste management—a Chinese case study on aseptic packaging, Int J Life Cycle Assess (2013) 18:626-635.

Minghui Xie et al., Life cycle assessment of the recycling of Al-PE (a laminated foil made from polyethylene and aluminum foil) composite packaging waste, Journal of Cleaner Production (2015), http://dx.doi.org/10.1016/j.iclepro.2015.08.067.

Olafsson et al., Delamination of Polyethylene and Aluminum Foil Layers of Laminated Packaging Material by Acetic Acid, vol. 58, No. 1, 1993—Journal of Food Science.

Olafsson et al., Transport of Oleic and Acetic Acids from Emulsions into Low Density Polyethylene; Effects on Adhesion with Aluminum Foil in Laminated Packaging, vol. 60, No. 2, 1995—Journal of Food Science.

Zhang et al., The Recycling of the Tetra-Pak Packages: Research on the Wet Process Separation Conditions of Aluminum and Polythene in the Tetra-Pak Packages, ©2009 IEEE, Universitaet Bielefeld. Downloaded on Feb. 17, 2021.

METHOD AND APPARATUS FOR RECYCLING PACKAGING MATERIAL

FIELD OF THE INVENTION

The invention comprises a separation fluid and its use, a method and an apparatus for recycling packaging material comprising a multilayer material comprising a metal layer and at least one plastic layer.

BACKGROUND OF THE INVENTION

The use of a microemulsion separation fluid for the separation of laminates or multilayer materials is known, for example, from the Applicant's patent application No. WO 2012/101189, which teaches the separation of layers in a multilayer material from each other. The examples of this WO'189 disclosure are directed towards the separation of multilayer materials used in photovoltaic modules.

The requirement to improve the recycling of laminates used in food packaging has been discussed. For example an article on "The recycling of tetra pak aseptic cartons" by Mario Abreu (found on www.environmental-expert.com) discusses this issue extensively and notes that the recycling of cellulose tissues is possible, but the separation of polyethylene from the aluminium foil is not possible.

U.S. Pat. No 5,421,526 (Tetra Laval) teaches a method of recovering individual material components, such as metal, plastic and, where applicable, paper, from waste of laminated packaging materials comprising layers of metal, plastic and possibly paper or cardboard. The layers are separated from each other by treating the waste with an organic acid or a mixture of organic acids, selected from among formic acid, acetic acid, propanoic acid, butyric acid and other similar volatile organic acids. The method of this patent is carried out at a high temperature (80° C.), above the flash point of acetic acid (ca. 60° C. at 80% concentration), which not only requires a large amount of energy, but also adds a safety risk. The mixture used is highly aggressive because of the high concentration (80%) of acetic acid. This mixture will attack the aluminium components and lead to formation of hydrogen, as well as a loss of the amount of aluminium recovered in the process.

European Patent Application EP 0 543 302 A1 (Kersting) teaches a method for separating aluminium foil from plastic foils, such as PE foils, to enable the recycling of the aluminium. The laminates are placed in a 20% solution of low fatty acids (e.g. acetic acid, propionic acid, formic acid, butanoic acid) and heated to 100° C. for 10-20 minutes. The method is preferably carried out in a closed vessel to operate the liquid at and/or above its boiling point. In addition, an underpressure can be created as the solution is cooled. The industrial feasibility of this method described in EP'302 is questionable, since the whole the waste material in the form of the aluminium and plastic foils together with the solution has to be heated and cooled for every charging cycle. This can be difficult to implement fast enough with large vessels, and requires vast amounts of energy.

Similarly, Chinese Patent Application CN 104744724 relates to a separation fluid for an aluminium plastic laminate and a method for carrying out the separation of aluminium layers from plastic layers by utilizing the separation fluid. The separation fluid is mainly prepared by mixing 40-200 parts of methanoic (formic) acid and 5-10 parts of dichloromethane and also contains 1-4 parts of a non-ionic surface active agent. The separation fluid of this application is highly volatile and also contains components that are harmful to the environment.

Chinese Patent Application No CN103131042 relates to another type of separating agent for separating aluminium-plastic multilayer material. This type of separating agent is prepared by mixing methanoic (formic) acid and ethanol in a volume ratio of 4:1-1:4. The separating method for an aluminium-plastic composite film by using the separating agent comprises the following steps: mixing the separating agent and water to obtain a separation fluid, and soaking a cleaned aluminium-plastic composite film in the separation fluid; and taking out, cleaning, centrifuging and drying. When the aluminium-plastic separation film is soaked in the solution mixed from the separation fluid and water, aluminium and plastic in the aluminium-plastic composite film can be efficiently separated. In the examples described in this Chinese patent application CN'042, temperatures between 50-80° C. are employed. These are conditions under which the separating agent is flammable and will attack the aluminium, giving rise to safety risks and aluminium loss.

US Patent Application No. 2002/0033475 A1 (Bejarano) discloses a synthetic treatment composition for the recycling of long-life packaging Tetra Brik® aseptic cartons. The composition disclosed in this patent application comprises lactic acid, sodium acetate, cellulose enzymes, α-amylase enzymes, maltose enzymes, citric acid and activated carbon. This composition is used to separate multilayer materials comprising of paper, polyethylene and aluminium.

International Patent Application No. WO 03/104315 A1 (Masuria) teaches a recycling method for composite materials having multiple layers comprising paper, aluminium and/or polymeric films. In this method, the composite material is treated with different solvents, like chloroform, tetrahydrofuran, xylene, protonic carboxylic acids or water depending on the characteristics of the adhesives used between the layers. The use of organic solvents, like halogenated media, in this method has, however, a negative environmental impact.

SUMMARY OF THE INVENTION

A use of a separating fluid for the separation of a metal layer from a polymer layer in a multiple layer material is taught in this disclosure. The method comprises placing the multiple layer material in a vat with a separation fluid for separating the layers in the multiple layer material. The separation fluid comprises a mixture of water, a short-chain carboxylic acid a phosphoric acid as well as an alkali metal hydroxide. It will be appreciated that the short-chain carboxylic acid and the phosphoric acid react partially with the alkali metal hydroxide to produce alkali metal phosphates and alkali metal carboxylates.

The short-chain carboxylic acids used are water miscible C1-C4 monocarboxylic acids, such as formic acid, acetic acid, propionic acid and butyric acid. In one aspect of the invention formic or acetic acid are used.

The alkali metal hydroxides include, but are not limited to, the hydroxides of lithium, sodium and potassium. In general, other hydroxides can be used if the other hydroxides do not form insoluble phosphate salts because these insoluble salts would interfere with passivation of aluminium, as taught in the method of this description.

The separation fluid has components that are less harmful to the environment than those known, for example, from the Chinese patent application. The volatility of the organic ingredients is lower, which minimizes emission of chemicals and the risk of an explosion, since the separation fluid of this document, as set out below, does not exhibit a to detectable flash point.

The method can also include the sieving/filtering of the separation fluid together with components of the multiple layer material to reclaim the components of the multiple layer material from the separation liquid, and thereafter sorting to obtain a first fraction of is metal from the metal layer and a second fraction of plastic from the polymer layer. In some aspects of the invention, a third fraction of a different kind of polymer can be obtained. This enables recycling of the materials from the multiple layer material. The obtained polymers can be extruded and the metal recovered in the form of metal shreds.

The disclosure also teaches a method for recycling the polymer components and metal components from a packaging material, such as a universal beverage container.

An apparatus for the recycling of packaging material is also disclosed. The apparatus comprises a vat having the separation fluid, a transportation device for transporting the multiple layer material into the vat and a sieving/filtration device for removing separated materials from the combination of the separation fluid and the packaging material.

It will be appreciated that the term "multilayer material" used in this disclosure is intended to encompass objects comprising several layers of material. Non-limiting examples of the several layers of materials include objects in which the layers are laminated, bonded or glued together or one of the materials could be deposited on another of the materials. The multiple layer material can include a paperboard layer, as known from beverage containers, but does not need to include a paperboard layer.

The method as described below in a non-limiting embodiment is used for the recycling of laminates in a beverage or food container. It will be appreciated, however, that the method can also find application in the recycling of other laminates used in other applications.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with the feature of a different aspect or aspects and/or embodiments of the invention.

Figure 1:
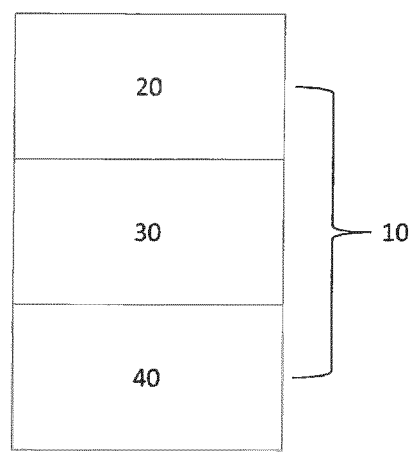
FIG. 1 shows one illustrative example of a laminate used in an aseptic packaging, which is recycled using the method of this disclosure.

FIG. 1 shows a non-limiting example of a laminate 10 used in an aseptic packaging. The laminate 10 comprises a first polymer layer 20, which is bonded to an aluminium layer 30, which is bonded in turn to a second polymer layer 40. Bonding agents are used between the different layers. Such bonding agents include, but are not limited to, ethylene/acrylic acid copolymer and/or polyurethane adhesives.

The laminate 10 is used, in one aspect of the invention, in an aseptic packaging, such as the ones used for stand-up pouches for beverages such as fruit juice and milk as well as tomato purees and similar fluids. Similar packaging is also used for other foods, such as snack foods, as well as for cosmetics. In some applications, one of the polymer layers is printed on one side, for example with a product description, or indeed on both sides.

In one non-limiting example of the invention, the polymer layer 20 is made of low-density polyethylene (LDPE) and the polymer layer 40 is made of polyethylene to terephthalate (PET). The metal layer 30 is made of aluminium. This is not limiting of the invention and other polyolefins or plastics, such as polypropylene (PP), polyamides or polyesters, could be used. Similarly the metal layer 30 could be an aluminium alloy or another metal.

Some types of packaging comprise only a single polymer layer 20 with the metal layer 30. For example, rejects from the production may only have the single polymer layer 20 with the metal layer 30. Other types of packaging material comprise two polymer layers 20 and 40 made of the same polymer. The teachings of this disclosure are also applicable to these types of multilayer materials, and are not restricted to the multilayer materials mentioned.

Figure 3:
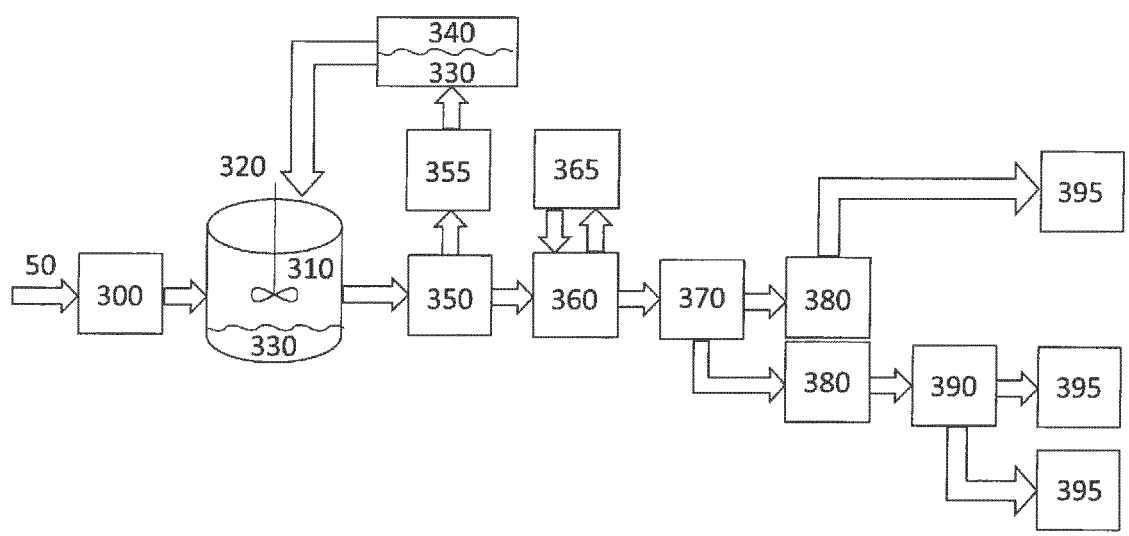
FIG. 3 shows an overview of the apparatus for recycling using the teachings of this disclosure.

FIG. 3 shows an overview diagram, which is an example of a recycling plant for the recycling of the multilayer laminates 10 of this disclosure. It will be appreciated that the plant shown in FIG. 3 is merely exemplary and is not limiting of the invention. The multilayer laminates 10 are constructed as above.

The recycling plant includes a cutting or shredding device 300, which cuts and shreds bales 50 of the packaging material made of the multilayer laminates 10. The cutting or shredding device 300 is followed by a vat 310 with an agitator 320 to stir up and agitate up the contents of the vat 310. The vat 310 contains a separation fluid 330 and a fluid dispenser 340 for dispensing the separation fluid 330 into the vat 310.

The materials can be sieved from the separation fluid 330 in a sieving device 350, and then the sieved materials will be washed with water in a washer 360. A first sorting step for separating components from the sieved materials can be conducted in wet environments, e.g. by use of float-sink-separation or centrifugation techniques, in a wet sorter 370. This results generally in two material streams. In the non-limiting example of the laminate 10 outlined above, one of the two material streams is substantially low-density polyethylene and the other of the material streams is a mixed stream comprising a mixture of aluminium and PET. The two material streams can be washed in a further washing step, if necessary.

The resulting two material streams can be dried in a drying unit 380 and subsequently purified in a dry sorting unit 390. The dry sorting, e.g. to extract the aluminium and the PET from the mixed stream, can be done, for example, by wind-sifting or electromagnetically based techniques. It will be appreciated that the sorting (wet or dry) can also be conducted in a single device or in more than two devices, depending on requirements.

The separation fluid 330 is recycled in a fluid recycling device 355, mostly to be cleaned of impurities by filtration and replenishing consumed chemicals. The washing water is also recycled to clean the washing water in a water-recycling device 365. The recycling includes cross-flow filtration techniques, reverse osmosis and/or liquid-liquid extraction, which also allow reclaiming of at least some of the chemicals of the separation fluid 330 from the washing water.

Figure 2:
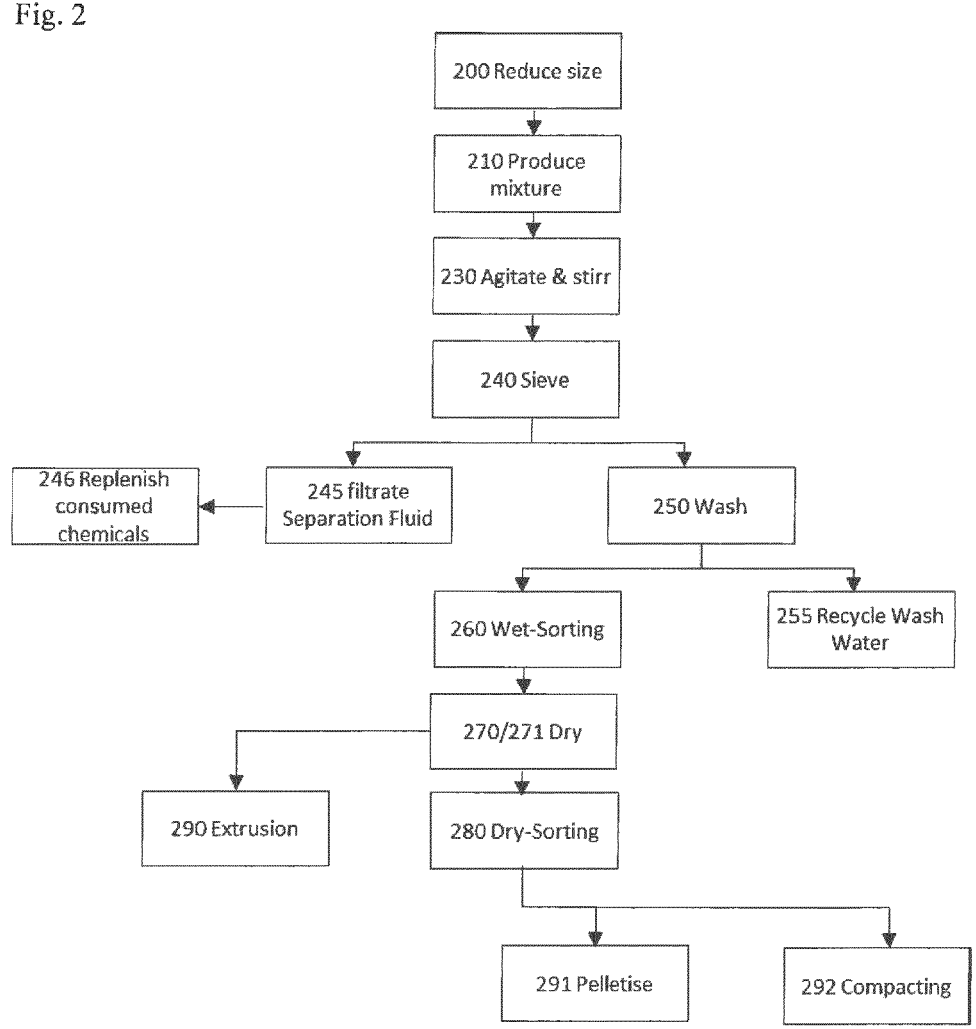
FIG. 2 shows a flow diagram of the method using the teachings of this disclosure.

FIG. 2 shows an outline of the method for recycling of the laminates 10 used in the apparatus shown in FIG. 3. The laminates 10 are collected together as bales 50 of packaging material. The laminates 10 will generally have been pressed together in the bales 50 to reduce their volume. The laminates 10 may have been washed to remove any food rest at a waste refuse collection and/or processing plant. On arrival at the recycling plant, the bales 50 are placed first into the cutting and shredding device 300 for size reduction in step 200. Batches of the cut/shred, laminates 10 are then loaded into the vat 310. The agitator 320 mixes the laminates 10 in step 210 with the separation liquid 300 in the vat 310 to produce a mixture.

In step 230, the mixture of the laminates 10 and the separation fluid 330 is further agitated and stirred for a pre-defined treatment time, e.g. 4 hours, leading to a separation of the multilayer laminates 10 into its constituent layers, i.e. the first polymer layer 20 of LDPE, the aluminium layer 30 and the second polymer layer 40 of the PET (in non-limiting example described above). In general, the effect of the separation fluid 330 is to remove the adhesive bond between the first polymer layer 20 of LDPE and/or the second polymer layer 40 and the metal layer 30 to produce metal shred from the metal layer 30 and polymer shred from the fist polymer layer 20 and the second polymer layer 40. This is to achieved at a given temperature, for example between 20° C. and 90° C., during a treatment time of typically between 30 minutes and 300 minutes. In one aspect of the method, the given temperature is 70° C. in another aspect of the method for universal beverage cartons, the given temperature will be between 30° C. and 50° C. The choice of temperature and process time largely depends on the type of adhesive bonding agents to be delaminated. The layers being bonded together with bonding agents from ethylene/acrylic acid copolymers delaminate at around 40° C. and those with bonding agents from polyurethane adhesives delaminate at around 70° C.

The mixture of the separation fluid 330 and the separated materials, i.e. LDPE, aluminium and PET can be removed from the vat 310 and sieved in step 240 in the sieve 350 to remove the solid materials, which include the LDPE from the first polymer layer 20, the PET from the second polymer layer 40 and most of the metal shred from the metal layer 30. The separation fluid 330 is then recycled by the device 355. The recycling is carried out by filtration in step 245 and replenishment of consumed chemicals in step 246. The recycled fluid is then placed back into the fluid dispenser 340. The filtration step 245 in device 355 removes substantially all of the solid impurities from the separating fluid 330, including the metal shred, which was not sieved out previously.

The solid material sieved out in step 240 is a mixture of the polymers and aluminium. This resulting material is washed in step 250 in the washer 360, and is then sorted in a wet sorting step 260 in the wet sorter 370 by means of a float-sink-separation or centrifugation technique into a light material, comprising mostly the LDPE, and a dense material, comprising mostly the aluminium and the PET. The light materials and the dense materials are dried separately in the steps 270 (light material) and 271 (dense material). The dried dense material is further sorted in step 280 in the dry sorter 390 by means of wind-sifting or electromagnetic techniques, to obtain an aluminium-rich material and a PET-rich material. It will be appreciated that the sorting (wet or dry) can also be conducted in one step, or in more than two steps depending on the requirements.

The washing water needs to be treated in step 255 with the water recycling device 365 before the washing water is also reused. These treatments include several filtration steps, with regular and cross-flow filtration techniques, reverse osmosis and/or liquid-liquid-extraction, which also allow at least some chemicals from the washing water to be reclaimed and transferred to the fluid recycling device 355 for reuse. In one aspect, the water recycling device 365 comprises a liquid-liquid-extraction unit combined with reverse osmosis.

The LDPE-rich materials can be extruded into granules in step 290. The metal shreds can be pressed into pellets in step 291 for recycling. Similarly, the PET-rich material can be compacted for shipment in step 292. The post treatment steps 290, 291 and 292 can be done in the devices 395, for example by extrusion or pressing machines.

The separating fluid 330 used in the vat 310 and coming from the fluid dispenser 340 comprises a mixture of water, short-chain carboxylic acid, phosphoric acid and alkali metal hydroxide. The short-chained carboxylic acids are, for example, water miscible C1-C4 monocarboxylic acids, such as formic acid, acetic acid, propionic acid and butyric acid. The alkali metal hydroxides are lithium, sodium or potassium hydroxide. The water is in one aspect of the invention deionised. The mixture of the short-chain carboxylic acid and the water reduces the adhesive intermolecular forces between the aluminium and the adhesive layer of the multilayer material. The phosphoric acid and the alkali metal hydroxide are added in order to control the side reaction of aluminium dissolution, as discussed below.

The separation fluid 330 is kept between 20° C. and 90° C., and at pH values between 2 and 4. The actual values are chosen depending on the properties of the input laminates 10 or other multilayer materials in the packaging material. Usually a low pH value favours performance of the separation, but also a side reaction which results in the dissolution of the aluminium. Ideally, the method of this disclosure achieves a sufficiently high yield of metal from the metal layer 30 or the polymers from the first polymer layer 20 and the second polymer layer 40 within the treatment time, while keeping the dissolution of the metal layer 30 to a minimum. The minimal dissolution of the metal layer 30 is important for safety reasons, since dissolution of the aluminium also leads to the formation of gaseous hydrogen, which represents an explosion hazard. The pH value is therefore adjusted by adding alkali metal hydroxide solution to the separation fluid 330.

The separation fluid 330 contains phosphoric acid, or alternatively salts of phosphoric acid (phosphates) in order to control the content of the dissolved aluminium in the separation fluid 330. The aluminium precipitates as aluminium phosphate under suitable conditions, by adjusting the pH value. The aluminium phosphate is a finely dispersed solid, which can be filtered out from the liquid in the step 245.

The phosphoric acid induces a thin passivation coverage layer of aluminium phosphate on the aluminium surfaces. These surface phosphates act as an inhibitor, partially passivating the aluminium surfaces from further chemical attack. Thus, the addition of the phosphoric acid further minimizes the aluminium dissolution.

The total reaction equation for aluminium dissolution and precipitation is:

$$2\ Al(s) + 2H_3PO_4(l) \rightarrow 2\ AlPO_4(s) + 3H_2(g)$$

The reaction products leave the separation fluid 330 in solid form or in gaseous form. The phosphoric acid is consumed and has to be replenished. This replenishment happens in the recycling device 355 during the step 246, alongside the replenishment of the other chemicals.

Other Examples of Multiple Layer Materials used in Packaging

Non-limiting examples of other multiple layer materials used in packaging materials include LDPE (=low-density polyethylene)/aluminium/PET, which is used in coffee packaging and drinks packaging, or PP (=polypropylene)/aluminium/polyester laminates used in coffee packaging and pet food packaging, or LDPE/alminium/LDPE, which is used in packaging for granulated raw materials for the industry or in tooth paste tubes. Another example are the inner parts (polymer and aluminium) of aseptic universal beverage carton which are usually composed of LLDPE (=linear low density to pol ethylene)/aluminium/LLDPE.

Application examples (Laboratory Scale)

The compositions listed below are merely examples of suitable formulations and are not limiting of the invention (all percentages by weight):

Composition 1

| | |
|---|---|
| Water | 45.7% |
| Glacial acetic acid | 45.0% |
| Phosphoric acid (30% solution) | 3.0% |
| Sodium hydroxide (33% solution) | 6.3% |

Composition 2

| | |
|---|---|
| Water | 45.7% |
| Formic acid | 45.0% |
| Phosphoric acid (30% solution) | 3.0% |
| Sodium hydroxide (33% solution) | 6.3% |

Composition 3

| | |
|---|---|
| Water | 45.7% |
| Propionic acid | 45.0% |
| Phosphoric acid (30% solution) | 3.0% |
| Sodium hydroxide (33% solution) | 6.3% |

The compositions 1 to 3 illustrate formulations with different shot-chain carboxylic acids.

Composition 4

| | |
|---|---|
| Water | 45.7% |
| Glacial acetic acid | 45.0% |
| Phosphoric acid (30% solution) | 3.0% |
| Potassium hydroxide (33% solution) | 6.3% |

The composition 4 illustrates a formulation with potassium hydroxide as metal hydroxide.

The examples listed below are merely examples of suitable applications and are not intended to be limiting of the invention. Examples 1 to 5 elucidate different packaging materials which can be treated with the separation composition 1 within the scope of the present invention. Examples 6 to 8 illustrate the use of other compositions of the separation fluid.

EXAMPLE 1

60 g of LDPE/aluminium/PET material (flakes. 1 cm$^2$, from beverage stand-up pouches) are stirred with 1 kg of separation liquid (composition 1) at 70° C. The detachment of the LDPE form the aluminium is complete after 2 h and the detachment of the PET from the aluminium is complete after 4 h.

EXAMPLE 2

30 g of LDPE/aluminium/PET material (flakes, 3 cm$^2$, from snack food packaging) are stirred with 1 kg of separation liquid (composition 1) at 70° C. The detachment of the UWE from the aluminium is complete after 2 h and the detachment of the PET from the aluminium is complete after 4 h.

EXAMPLE 3

60 g of LDPE/aluminium/LDPE material (flakes, 2 cm$^2$, from tooth paste tubes) are stirred with 1 kg of separation liquid (composition 1) at 70° C. The detachment of the LDPE from the aluminium is complete after 2 h.

EXAMPLE 4

Three single specimens of PP/aluminium/PET flakes (1 cm$^2$, laminate sample like coffee packaging from foil and converter companies) are shaken with 20 g of separation liquid (composition 1) at 70° C. The detachment of the PP and of the PET from the to aluminium is complete after 5 h.

EXAMPLE 5

30 g of LLDPE/aluminium/LLDPE+LLDPE material (flakes, 10 cm$^2$, inner parts of aseptic beverage carton) are stirred with 1 kg of separation liquid at 40° C. The detachment of aluminium from the LLDPE is complete after 2 h.

EXAMPLE 6

Five single specimens of PE/aluminium/PET flakes (1 cm$^2$, laminate sample like coffee packaging from foil and converter companies) are shaken with 20 g of separation liquid (composition 2) at 70° C. The detachment of the PE and of the PET from the aluminium is complete after 1 h.

EXAMPLE 7

Five single specimens of PE/aluminium/PET flakes (1 cm$^2$, laminate sample like coffee packaging from foil and converter companies) are shaken with 20 g of separation liquid (composition 3) at 70° C. The detachment of the PE and of the PEI' from the aluminium is complete after 10 h.

EXAMPLE 8

Five single specimens of PE/aluminium/PET flakes (1 cm$^2$, laminate sample like coffee packaging from foil and converter companies) are shaken with 20 g of separation liquid (composition 4) at 70° C., The detachment of the PE and of the PET from the aluminium is complete after 8 h.

REFERENCE NUMERALS

10 Multilayer material
20 First polymer layer
30 Metal layer
40 Second polymer layer
50 Bales 300 Cutting or shredding device
310 Vat
320 Agitator
330 Separation fluid
340 Fluid dispenser
350 Sieving device
355 Fluid recycling device
360 Washer
365 Water-recycling device
370 Wet sorter
380 Drying unit
390 Dry sorting unit
395 Post processing

The invention claimed is:

1. A method of separation of a metal layer from a polymer layer in a multilayer material comprising placing the multilayer material in a separation fluid, the separation fluid comprising a mixture of 30-60% by weight of water, and a 30-60% by weight of short-chain carboxylic acid to separate the metal layer from the polymer layer, and further comprising 0.5-5% by weight of phosphoric acid 30% solution and an 2-8% by weight of alkali metal hydroxide 33% solution to reduce dissolution of the metal layer.

2. The method of claim 1, wherein the short-chain carboxylic acid, phosphoric acid and alkali metal hydroxide react partially in solution to form alkali metal phosphate and alkali metal carboxylates.

3. The method of claim 1, wherein the short-chain carboxylic acid is a water miscible C1-C4 monocarboxylic acid.

4. The method of claim 3, wherein the short chain carboxylic acid is selected from the group consisting of formic acid, acetic acid, propionic acid or butyric acid.

5. The method of claim 1, wherein the alkali metal hydroxide is selected from the group consisting of lithium hydroxide, sodium hydroxide or potassium hydroxide.

6. The method of claim 1, wherein components of the mixture comprise 42-48% by weight of short-chained carboxylic acid, 2-4% by weight of phosphoric acid 30% solution and 4-8% by weight of alkali metal hydroxide 33% solution, and 45-50% by weight of water.

7. The method of claim 1, wherein the separation fluid has a pH value of between 2 and 4.

* * * * *